US009744880B2

(12) United States Patent
Jamieson et al.

(10) Patent No.: US 9,744,880 B2
(45) Date of Patent: Aug. 29, 2017

(54) MEMBER MOUNTING BRACKET

(71) Applicant: Lear Corporation, Southfield, MI (US)

(72) Inventors: Richard Jamieson, Warwickshire (GB); Mark Palmer, Northampton (GB)

(73) Assignee: LEAR CORPORATION, Southfield, MI (US)

( * ) Notice: Subject to any disclaimer, the term of this patent is extended or adjusted under 35 U.S.C. 154(b) by 39 days.

(21) Appl. No.: 14/457,369

(22) Filed: Aug. 12, 2014

(65) Prior Publication Data

US 2015/0232009 A1     Aug. 20, 2015

Related U.S. Application Data

(60) Provisional application No. 61/940,629, filed on Feb. 17, 2014.

(51) Int. Cl.
| B60N 2/68 | (2006.01) |
| B60N 2/00 | (2006.01) |
| B60N 2/70 | (2006.01) |
| B60N 2/02 | (2006.01) |

(52) U.S. Cl.
CPC ............. *B60N 2/002* (2013.01); *B60N 2/682* (2013.01); *B60N 2/7094* (2013.01); *B60N 2002/0264* (2013.01)

(58) Field of Classification Search
CPC .............. B60N 2002/0264; B60N 2002/0236
USPC ..................................................... 297/217.3
See application file for complete search history.

(56) References Cited

U.S. PATENT DOCUMENTS

| 3,670,119 | A |   | 6/1972 | Gebhardt et al. |
| 4,927,209 | A | * | 5/1990 | Maruyama ........... B60N 2/5825 297/180.12 |
| 6,021,863 | A |   | 2/2000 | Stanley |
| 6,537,641 | B1 | * | 3/2003 | Kroll ...................... B60N 3/046 296/208 |
| 6,540,303 | B2 | * | 4/2003 | Mosquera ............ B60N 2/5883 219/217 |
| 8,151,654 | B2 |   | 4/2012 | Speckhart et al. |
| 8,714,646 | B2 | * | 5/2014 | Cvek .................... A47C 1/0242 297/217.3 |
| 2005/0184565 | A1 | * | 8/2005 | Weiss ................... B60N 2/5635 297/180.15 |
| 2006/0137481 | A1 | * | 6/2006 | Schmied ................ B60N 2/002 73/865.9 |
| 2007/0241595 | A1 | * | 10/2007 | Nathan ...................... B06B 3/00 297/217.3 |
| 2008/0191526 | A1 | * | 8/2008 | Orlewski ............... B60N 2/002 297/217.3 |

(Continued)

FOREIGN PATENT DOCUMENTS

| EP | 1860000 A2 | 11/2007 |
| WO | 2008043536 A1 | 4/2008 |

*Primary Examiner* — David R Dunn
(74) *Attorney, Agent, or Firm* — MacMillan, Sobanski & Todd, LLC

(57) ABSTRACT

A mounting bracket for supporting a member on a frame assembly of a seat assembly includes a base with a mounting feature provided on a first side and a plurality of attachment features provided on a second side. The mounting features are adapted to engage a frame assembly of the seat assembly, and the attachment features are adapted to engage the member.

19 Claims, 5 Drawing Sheets

(56) References Cited

U.S. PATENT DOCUMENTS

| | | | |
|---|---|---|---|
| 2010/0212988 A1* | 8/2010 | Nemec | B60K 28/04 180/273 |
| 2012/0166046 A1 | 6/2012 | Speckhart et al. | |
| 2013/0119726 A1* | 5/2013 | Arefi | B60N 2/686 297/217.3 |
| 2013/0119728 A1* | 5/2013 | Schmitt | B60N 2/54 297/217.3 |
| 2014/0159447 A1* | 6/2014 | Saitou | B60N 2/70 297/217.3 |
| 2014/0246887 A1* | 9/2014 | Clos | G01L 1/04 297/217.3 |

* cited by examiner

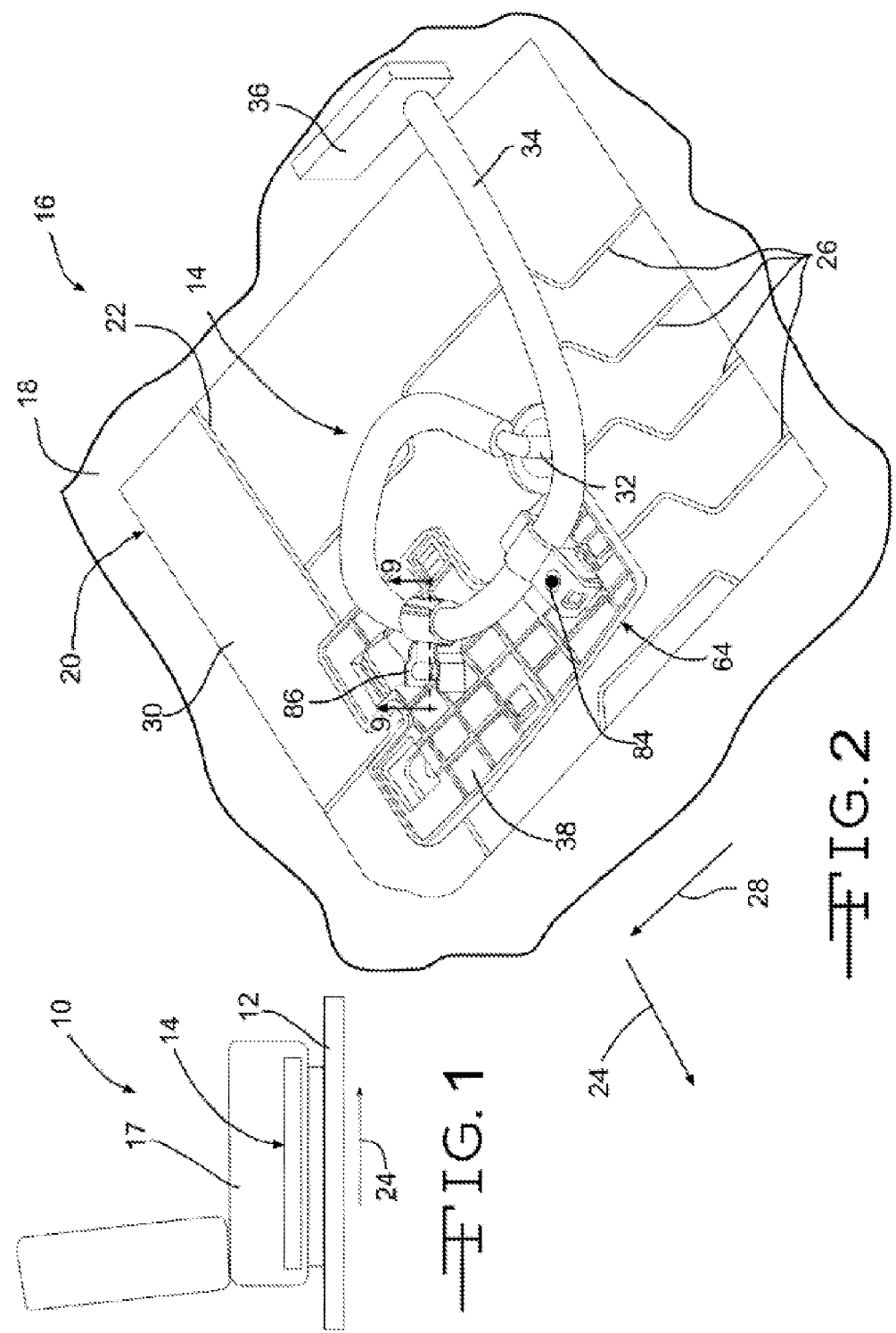

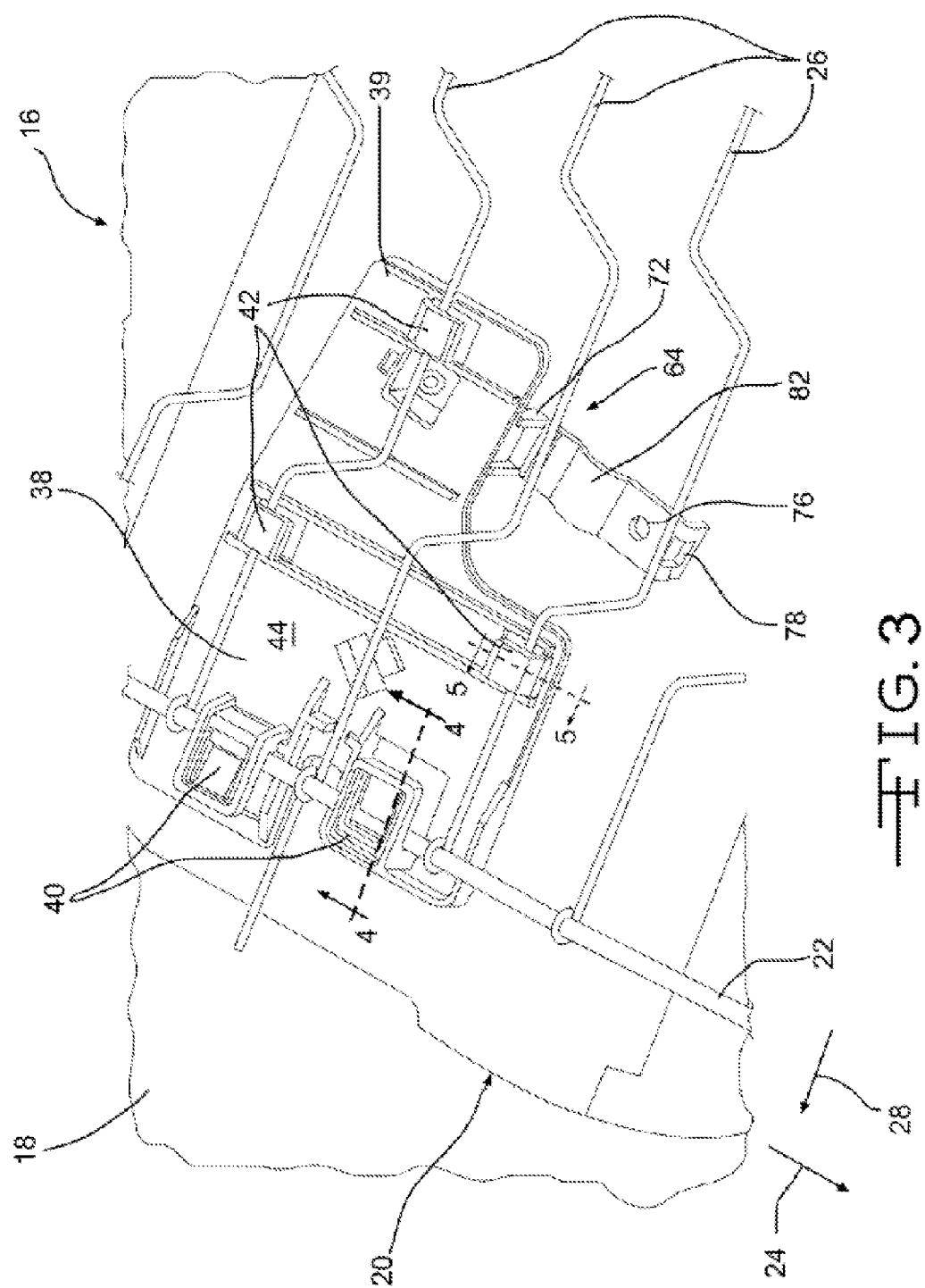

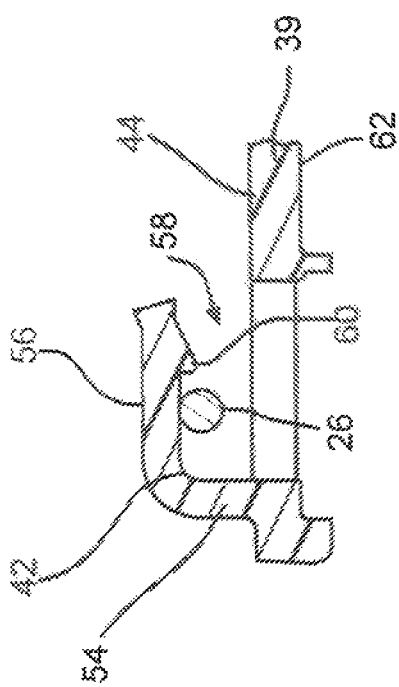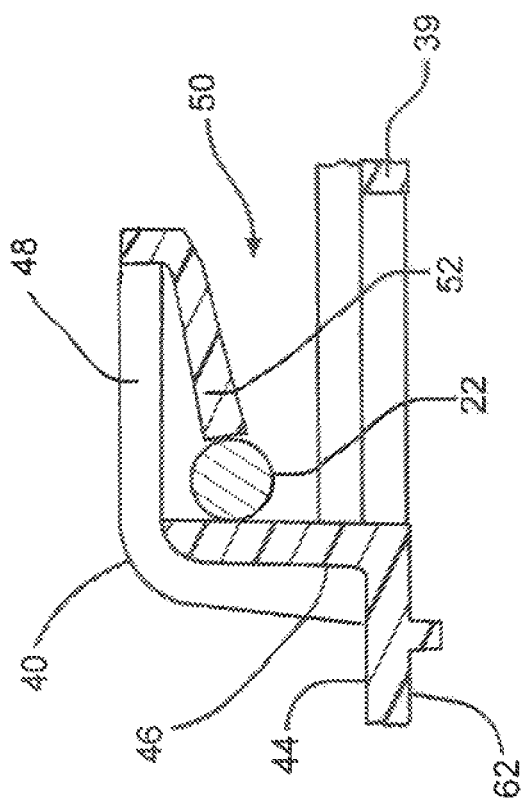

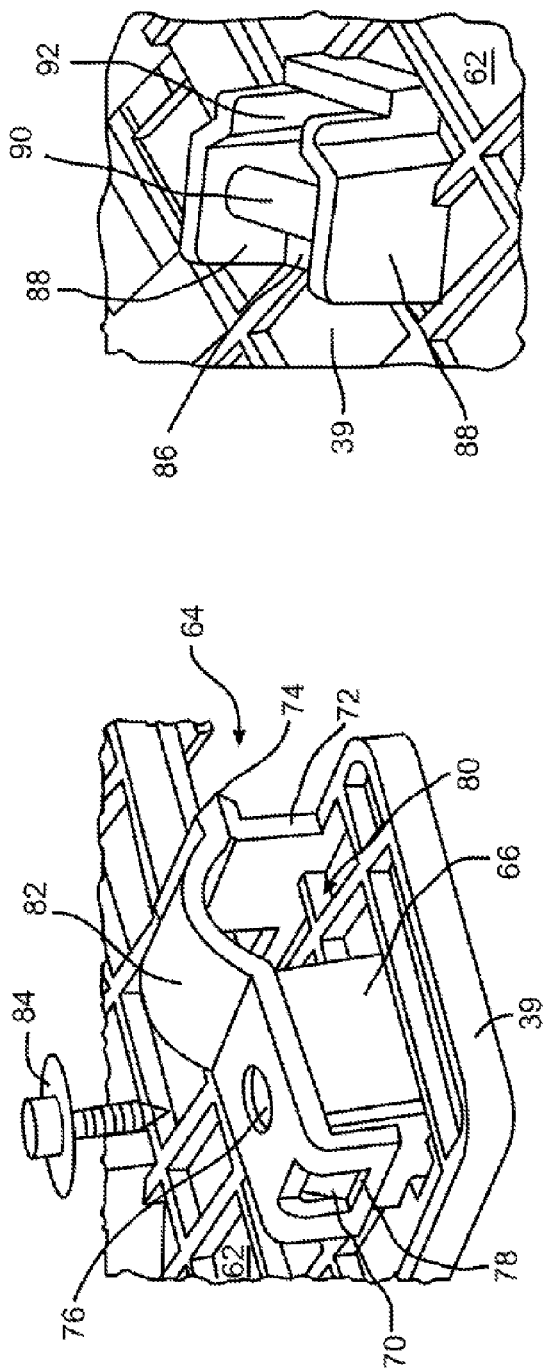
FIG. 7
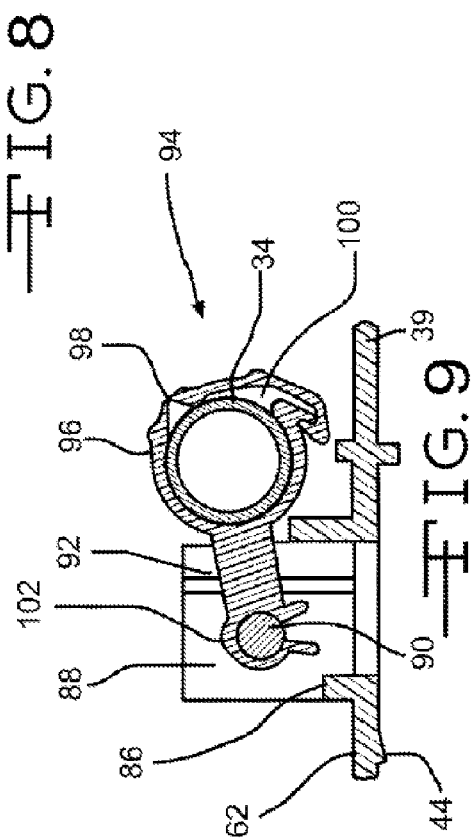
FIG. 8
FIG. 9

MEMBER MOUNTING BRACKET

CROSS-REFERENCE TO RELATED APPLICATIONS

This application claims the benefit of U.S. Provisional Application No. 61/940,629 filed Feb. 17, 2014, the disclosure of which is incorporated herein by reference.

BACKGROUND OF THE INVENTION

This invention relates in general to an assembly for routing a flexible hose or conduit. More specifically, this invention relates to a bracket for routing a flexible member relative to a seat.

Some seats may include accessories or sensors. These accessories may be connected to other components by flexible members. For example, a vehicle seat may include a weight sensor that is used to determine if there is an occupant in the seat. This can be used to control whether an air bag is activated or the discharge pressure of the airbag. The weight sensor may include a bladder that is connected to a pressure sensor by a hose.

The hose may be a flexible member, and it is desirable to prevent the hose from moving freely relative to the seat after the weight sensor is installed. In order to limit the movement of the hose, an installer may use a clamp to attach the hose to a frame of the seat. Depending on the length and flexibility of the hose, it may be desirable to use multiple clamps. It is also desirable to properly position the hose during installation to prevent the hose from being damaged, kinked, or twisted during both installation and use of the seat. This may be accomplished by selecting a route for the hose between the bladder and the pressure sensor that avoids sharp edges, as well as avoids sharp bends of the hose. The hose may be placed in the selected route by attaching the clamps to the seat frame at selected locations. It is desirable to have an improved assembly for attaching a flexible member to the seat frame.

SUMMARY OF THE INVENTION

This invention relates to a mounting bracket for attaching a member to a seat assembly. The mounting bracket includes a base with mounting features on a first side and attachment features on a second side. The mounting features are adapted to engage a frame assembly of the seat assembly, and the attachment features are adapted to engage the member.

This invention also relates to a seat assembly. The seat assembly includes a frame assembly and a mounting bracket attached thereto. The mounting bracket includes a plurality of attachment features to secure a member thereto.

Another embodiment of this invention further relates to a seat assembly that includes a member attached to the mounting bracket by a plurality of attachment features.

BRIEF DESCRIPTION OF THE DRAWINGS

FIG. 1 is a schematic side view of a seat assembly including an occupant sensor.

FIG. 2 is a bottom perspective view (looking upwardly) of a portion of a frame assembly of the seat assembly, showing the occupant sensor and a mounting bracket in accordance with this invention.

FIG. 3 is a top perspective view (looking downwardly) of the portion of the frame assembly, showing the mounting bracket connected to the frame assembly without the occupant sensor.

FIG. 4 is a cross-sectional view taken along line 4-4 of FIG. 3.

FIG. 5 is a cross-sectional view taken along line 5-5 of FIG. 3.

FIG. 7 is a detail view of a clamp of the mounting bracket.

FIG. 8 is a detail view of a retainer of the mounting bracket.

FIG. 9 is a cross-sectional view taken along the line 9-9 of FIG. 2.

DETAILED DESCRIPTION OF THE PREFERRED EMBODIMENT

Figure 6:
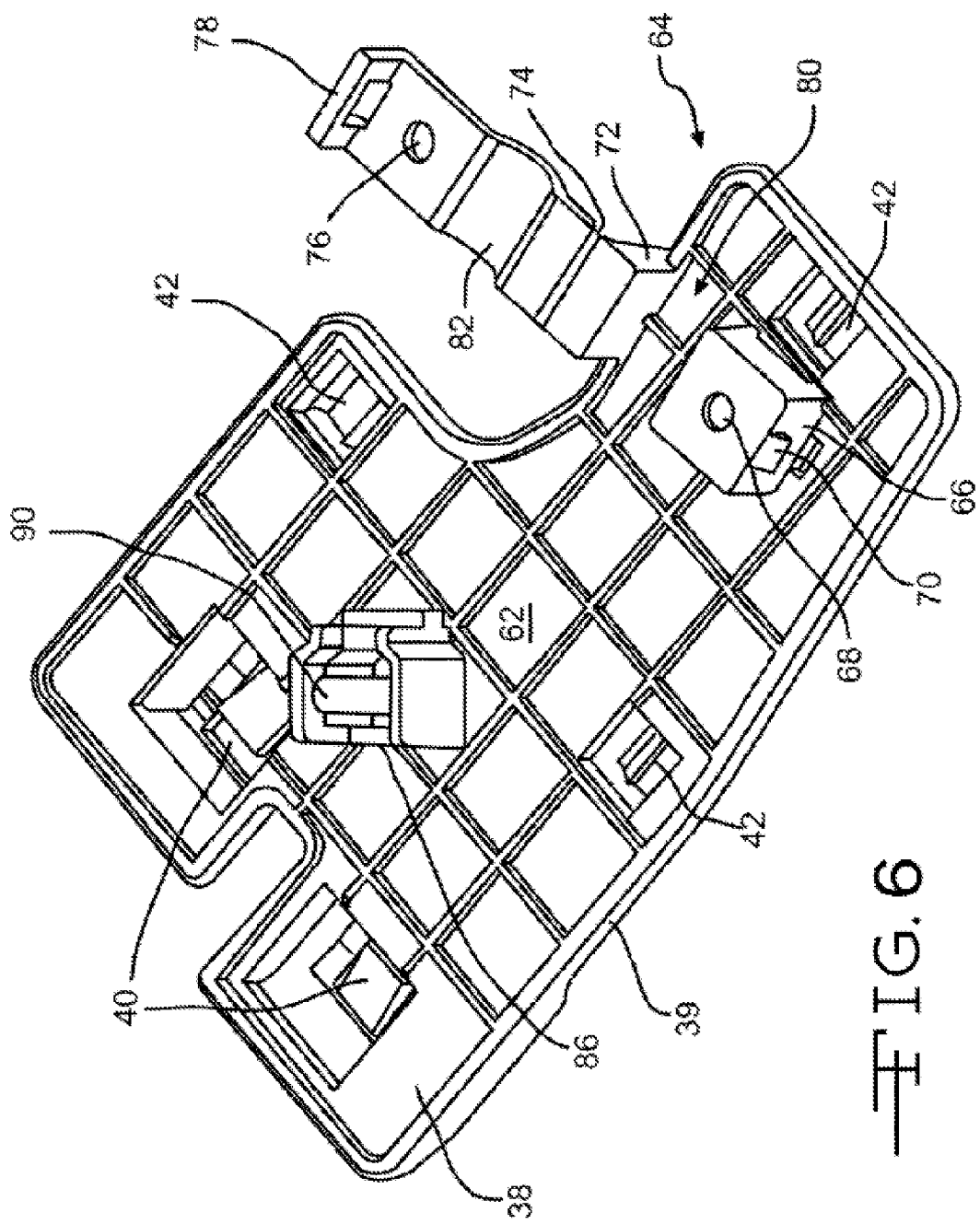
FIG. 6 is a perspective view of the mounting bracket.

Referring now to the drawings, there is illustrated in FIG. 1 a side, schematic view of a seat assembly, indicated generally at 10. The illustrated seat assembly 10 is a vehicle passenger seat, but may be any other desired seat. The position of the seat assembly 10 may be adjustable relative to a floor 12, but this is not necessary. The illustrated seat assembly 10 includes a sensor assembly, indicated generally at 14. The illustrated sensor assembly 14 is a weight sensor that is used to detect when the seat assembly 10 is occupied. However, the sensor assembly 14 may be any desired type of sensor or any other desired accessory.

Referring to FIG. 2, a perspective view is shown looking up at the seat assembly 10 from below. The illustrated seat assembly 10 includes a frame assembly, indicated generally at 16. The illustrated frame assembly 16 provides support for a seat cushion 17 (shown in FIG. 1) as well as an occupant of the seat assembly 10. The illustrated frame assembly 16 includes a cushion pan 18 that is made of stamped sheet metal and provides a rigid frame for the seat assembly 10. The cushion pan 18 may be made of any other desired material and by any desired method. The illustrated cushion pan 18 defines a pan opening indicated at 20. The illustrated frame assembly 16 includes a first suspension wire 22 that is connected to the cushion pan 18 and extends in the longitudinal direction 24 across the pan opening 20. The illustrated frame assembly 16 also includes a plurality of second suspension wires 26 that generally extend in a lateral direction 28 across the pan opening 20. The second suspension wires 26 may be connect to the cushion pan 18 or the first suspension wire 22. The first suspension wire 22 and the second suspension wires 26 may be made of metal or any other desired material and serve to support the seat cushion 17. The illustrated second wires 26 are generally perpendicular to the illustrated first wire 22, but the wires 22 and 26 may have any other desired relative orientation. It should be appreciated that the frame assembly 16 may have an arrangement of suspension wires 22 and 26 different from that illustrated, if desired. Additionally, it should be appreciated that the illustrated suspension wires 22 and 26 are support members for the seat cushion 17 of the seat assembly 10, but the frame assembly 16 may include any other desired support structure.

The sensor assembly 14 is also visible in FIG. 2. The illustrated sensor assembly 14 includes a bladder 30 that is located above the suspension wires 22 and 26. The illustrated bladder 30 is suitable to function as a weight sensing pad and contains a fluid (not shown) such as a silicone or silica gel, or any other desired fluid. The illustrated bladder 30 includes a port 32 which may be made of plastic or any other desired material. In the illustrated sensor assembly 14, a hose 34 connects the port 32 to a pressure sensor 36 and allows fluid communication between the bladder 30 and the pressure sensor 36. The hose 34 may be filled with the same fluid as the bladder 30 so that when the seat occupant applies pressure on the bladder 30, the fluid is pressurized within the bladder 30 and the hose 34. The increased pressure of the fluid may be measured by the pressure sensor 36 and this pressure increase may be used to calculate the seat occupant's weight. It should be appreciated that the above description of the illustrated sensor assembly 14 is only a description of the illustrated embodiment, and the sensor assembly 14 may differ from that shown, if desired.

The hose 34 is a flexible member that may be positioned properly relative to the frame assembly 16 by an installer during assembly of the seat assembly 10. It may be desirable to prevent the hose 34 from twisting or kinking, as that may alter the fluid communication between the bladder 30 and the pressure sensor 36. In the illustrated sensor assembly 14, the hose 34 is routed in a relatively gentle arc. A mounting bracket 38 is provided to assist in proper positioning of the hose 34 relative to the frame assembly 16, as well as securing the hose 34 in that position. The illustrated mounting bracket 38 is made of plastic, but it may be made of any other desired material. As will be described below, the mounting bracket 38 includes mounting features that assist in positioning the mounting bracket 38 relative to the frame assembly 16 and securing the mounting bracket 38 thereto. Also, the mounting bracket 38 includes attachment features that assist in positioning the hose 34 relative to the mounting bracket 38 and securing the hose 34 thereto.

Referring to FIG. 3, a perspective view is shown looking down at the frame assembly 16 from above. The sensor assembly 14, including the bladder 30 and the hose 34, are not shown. The illustrated mounting bracket 38 includes a base 39 with a plurality of first mounting clips 40 and second mounting clips 42 located on a first side 44 thereof. The illustrated mounting clips 40 are configured to engage the first suspension wire 22, while the illustrated mounting clips 42 are configured to engage the second suspension wires 26.

A cross-sectional view of one of the first mounting clips 40 is shown in FIG. 4. The illustrated first mounting clip 40 includes a stem 46 that extends from the first side 44 of the mounting bracket 38 and an extension 48 that extends from the stem 46 in a direction generally parallel to the first side 44. The illustrated first side 44, stem 46 and extension 48 define a clip space, indicated at 50. The illustrated first mounting clip 40 also includes a resilient tab 52 that extends from the extension 48 into the clip space 50 and toward the first side 44. When the mounting bracket 38 is attached to the frame assembly 16, the first suspension wire 22 is positioned within the clip space 50. The first suspension wire 22 may engage and deflect the resilient tab 52 toward the extension 48 during installation. When the first suspension wire 22 is positioned close enough to the stem 46, the illustrated resilient tab 52 deflects away from the extension 48 to the position shown in FIG. 4. The illustrated first mounting clip 40 then traps the first suspension wire 22 in the position shown in FIG. 4.

A cross-sectional view of one of the second mounting clips 42 is shown in FIG. 5. The illustrated second mounting clip 42 includes a stem 54 that extends from the first side 44 of the mounting bracket 38 and a resilient extension 56 that extends from the stem 54 in a direction generally parallel to the first side 44. The illustrated first side 44, stem 54 and resilient extension 56 define a clip space, indicated at 58. The illustrated second mounting clip 42 also includes a hook 60 that extends from the resilient extension 56 into the clip space 58 and toward the first side 44. When the mounting bracket 38 is attached to the frame assembly 16, the second suspension wire 26 is positioned within the clip space 58. The second suspension wire 26 may engage the hook 60 and deflect the resilient extension 56 away from the first side 44 during installation. When the second suspension wire 26 is positioned close enough to the stem 54, the illustrated resilient extension 56 deflects toward the first side 44 to the position shown in FIG. 5. The illustrated second mounting clip 42 then traps the second suspension wire 26 in the position shown in FIG. 5. It should be appreciated that the mounting clips 40 and the mounting clips 42 may have configurations different from those shown, if desired.

The illustrated mounting bracket 38 includes first mounting clips 40 and second mounting clips 42 in positions and orientations such that the mounting bracket 38 can only be positioned and attached to the frame assembly 16 in one position relative to the frame assembly 16. This helps to assure that the mounting bracket 38 is properly positioned relative to the frame assembly 16 during assembly of the seat assembly 10, since it may not be obvious to the installer whether the mounting bracket 38 is properly positioned or not properly positioned. This will also help to assure that the hose 34 is properly routed relative to the seat assembly 10, since the illustrated mounting bracket 38 includes the attachment features that may guide the routing of the hose 34, as will be described below.

Referring now to FIG. 6, a bottom view of the mounting bracket 38 is shown. The illustrated attachment features are located on a second side 62 of the mounting bracket 38. The illustrated mounting bracket 38 includes a clamp, indicated at 64. The clamp 64 is shown in an open position in FIG. 6. Referring to FIG. 7, the clamp 64 is shown in a closed position. The illustrated clamp 64 includes a post 66 that extends from the second side 62. The post 66 defines a post hole 68 and includes a hook 70. The illustrated clamp 64 also includes a clamp tab 72 that extends from the second side 62. The illustrated clamp tab 72 includes a living hinge 74, which may be embodied as a reduced-thickness portion of the clamp tab 72 that allows the clamp tab 72 to be folded at the living hinge 74. The clamp tab 72 also defines a tab hole 76 and includes a clasp 78. The illustrated clamp 64 is molded integrally with the mounting bracket 38. However, the clamp 64 may be made separately and attached to the mounting bracket 38, if desired.

The illustrated clamp tab 72 may be moved between the open position (shown in FIG. 6) and the closed position (shown in FIG. 7) by folding the clamp tab 72 at the living hinge 74. When the illustrated clamp tab 72 is in the closed position, the clasp 78 on the clamp tab 72 is engaged by the hook 70 on the post 66 to retain the clamp tab 72 in the closed position. Also, when the illustrated clamp tab 72 is in the closed position, the tab hole 76 is aligned coaxially with the post hole 68. The illustrated clamp 64 defines a clamp space indicated at 80 between the second side 62, the post 66, and the clamp tab 72. The clamp space 80 accommodates the hose 34 when the hose 34 is attached to the mounting bracket 38 (as shown in FIG. 2). The clamp tab 72 may include an arcuate portion 82 to accommodate the size of the hose 34.

A screw 84 may be inserted through the tab hole 76 and threaded into the post hole 68. The illustrated screw 84 has a head that is larger than the tab hole 76 so that the screw 84 retains the clamp tab 72 in the closed position. The screw 84 may deform the plastic material of the post 66 to provide self-threading operation.

Optionally, a special screw driving tool (not shown) may be used during installation which monitors the torque applied to the screw 84. The tool can alert an installer when the desired torque is reached when screwing the screw 84 into the post 66. The operation of using the tool can also be monitored such that if the tool is not operated to drive the screw 84 into the post 66, an assembly line can be halted until the operation has been completed. This helps to ensure that the installer completes the locking of the clamp 64 by use of the screw 84 and does not rely solely on the engagement of the clasp 78 with the hook 70, as described above.

Referring back to FIG. 6, the illustrated mounting bracket 38 includes a retainer 86 for further securing the hose 34 to the mounting bracket 38. A perspective view of the retainer 86 is shown in FIG. 8. The illustrated retainer 86 is integrally molded with the mounting bracket 38, but may be made separately if desired. The illustrated retainer 86 includes a pair of spaced-apart side walls 88 that extend from the second side 62. A beam 90 may extend between the side walls 88. The beam 90 may have the same diameter as either the first suspension wire 22 or the second suspension wire 26, or may have any other desired size or shape. The illustrated retainer also includes a narrowed region 92 where the side walls 88 are angled toward each other.

As shown in FIG. 9, the hose 34 may be provided with a clip, indicated generally at 94. The illustrated clip 94 includes a tubular clamp member 96 for securing to the hose 34. The clamp member 96 may be formed as a single piece with a living hinge 98. The illustrated clamp member 96 can be moved from an open position to a closed position (shown in FIG. 9), wherein the clamp member 96 defines a clip opening 100 that is configured to accommodate the hose 34. The clip 94 may be positioned on the hose 34 and folded at the living hinge 98 in order to attach the clip 94 to the hose 34. The illustrated clip 94 includes a clip hook 102 that is configured to resiliently engage a generally cylindrical object. The clip hook 102 may be connected to the beam 90 of the retainer 86 (as shown in FIG. 2 and FIG. 9). It should be appreciated that the illustrated clip hook 102 may alternatively be connected to the first suspension wire 22 or the second suspension wire 26, which allows the clip 94 to be used without the mounting bracket 38, if desired.

As previously described, the illustrated attachment features (the clamp 64 and retainer 86) may help to assure that the hose 34 is properly routed relative to the seat assembly 10. The attachment features (the clamp 64 and retainer 86) may help the installer to position the hose 34 properly relative to the mounting bracket 38 and relative to the frame assembly 16. Thus, the use of the mounting bracket 38 may reduce the possibility of the hose 34 being installed in an undesired position, and may help assure that the hose 34 is routed properly relative to the frame assembly 16.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A combined mounting bracket and flexible hose assembly comprising:
    a mounting bracket including a base including a first side that faces in a first direction and a second side that faces in a second direction that is opposite to the first direction; a mounting feature extending in the first direction from the first side of the base and adapted to secure the base to a frame assembly of a seat; and a plurality of attachment features extending in the second direction from the second side of the base; and
    a flexible hose that connects a pressure sensor to a sensor assembly and is connected to the plurality of attachment features of the base.

2. The mounting bracket of claim 1, wherein the mounting feature is one of a plurality of mounting features provided on the first side of the base, and wherein each of the plurality of mounting features is adapted to secure the base to the frame assembly of the seat.

3. The mounting bracket of claim 1, wherein the mounting feature is adapted to secure the base to the frame assembly in only one position relative to the frame assembly.

4. The mounting bracket of claim 1, wherein the mounting feature is a clip that is adapted to resiliently secure the base to the frame assembly.

5. The mounting bracket of claim 1, wherein each of the plurality of attachment features is a clamp that is adapted to secure the flexible hose to the base.

6. The mounting bracket of claim 1, wherein the base is adapted to be positioned between the frame assembly and the flexible hose.

7. The mounting bracket of claim 1, further including a bladder that communicates through the flexible hose with a pressure sensor.

8. A seat assembly comprising:
    a frame assembly;
    a mounting bracket that is secured to the frame assembly by a mounting feature provided on a first side of the mounting bracket; and
    a flexible hose that is secured to the mounting bracket by a plurality of attachment features provided on a second side of the mounting bracket, wherein:
    the first side of the mounting bracket faces in a first direction;
    the second side of the mounting bracket faces in a second direction that is opposite to the first direction;
    the mounting feature extends in the first direction from the first side of the mounting bracket, is capable of positioning the mounting bracket to the frame assembly in only one position relative to the frame assembly, and secures the mounting bracket to the frame assembly in the one position relative to the frame assembly; and
    the plurality of attachment features extends in the second direction from the second side of the mounting bracket.

9. The seat assembly of claim 8, wherein the mounting bracket includes a base, the mounting feature is provided on a first side of the base, and the plurality of attachment features is provided on a second side of the base.

10. The seat assembly of claim 8, wherein the mounting bracket is secured to the frame assembly by a plurality of mounting features provided on the first side of the mounting bracket.

11. The seat assembly of claim 8, wherein the mounting bracket is configured to be secured to the frame assembly in only one position relative to the frame assembly.

12. The seat assembly of claim 8, wherein the mounting feature is a clip that is resiliently secured to the frame assembly.

13. The seat assembly of claim 8, wherein each of the plurality of mounting features is secured to both a first support member and second support members that are both provided on the frame assembly, wherein the first support members are generally perpendicular to the second support members.

14. The seat assembly of claim 8, further including a bladder that communicates through the flexible hose.

15. The seat assembly of claim 8, further including a bladder that communicates through the flexible hose with a pressure sensor.

16. A seat assembly comprising:
 a frame assembly;
 a pressure sensor that is connected to a sensor assembly by a flexible hose; and
 a mounting bracket including (1) a base having a first side and a second side that is opposite to the first side, (2) a mounting feature provided on the first side of the base that supports the mounting bracket on the frame assembly, and (3) a plurality of attachment features provided on the second side of the base that supports the flexible hose on the mounting bracket.

17. The seat assembly defined in claim 16 wherein the sensor assembly includes a bladder that communicates through the flexible hose with the pressure sensor.

18. The seat assembly defined in claim 16 wherein the seat frame assembly includes a suspension wire, and wherein the mounting feature provided on the first side of the base is attached to the suspension wire.

19. The seat assembly defined in claim 16 wherein the seat frame assembly includes a plurality of suspension wires, and wherein a plurality of mounting features provided on the first side of the base is attached to the plurality of suspension wires.

\* \* \* \* \*